Patented Aug. 29, 1944

2,357,261

UNITED STATES PATENT OFFICE 2,357,261

PREPARATION OF DICYANDIAMIDE SALTS

Donald W. Kaiser, Riverside, Conn., assignor to American Cyanamid Company, New York, N. Y., a corporation of Maine No Drawing. Application April 28, 1942
Serial No. 440,879

9 Claims. (Cl. 23—78)

This invention relates to the preparation of dicyandiamide salts, and more particularly, to a method of preparing alkali metal and alkaline earth metal salts of dicyandiamide.

Although certain dicyandiamide salts have been prepared heretofore under anhydrous conditions it has not been considered possible to prepare dicyandiamide salts, particularly the alkali metal and alkaline earth metal salts, in the presence of water. This belief has been based partly upon the extremely low dissociation constant of dicyandiamide, reported as $0.6 \times 10^{-14}$ at 25° C., and partly upon the fact that aqueous solutions of dicyandiamide salts are highly hydrolyzed; a 0.1 molar solution of sodium dicyandiamide, for example, being 94.5% hydrolyzed and less concentrated solutions being completely hydrolyzed.

Despite the almost completely neutral reaction of dicyandiamide and the instability of its salts in aqueous media I have found that the alkali metal and alkaline earth metal salts of dicyandiamide can be prepared and recovered as such by reacting dicyandiamide with water-soluble alkali metal and alkaline earth metal hydroxides in the presence of water. Insofar as I am aware the production of alkali metal and alkaline earth metal salts of dicyandiamide in aqueous media has been successfully accomplished before. One of the principal objects of the present invention is therefore the preparation of the alkali metal and alkaline earth metal salts of dicyandiamide by a new and advantageous method. Another object of the invention is the production of these dicyandiamide salts in a form suitable for use as intermediates in the preparation of other organic compounds or as distinct chemical compounds of direct utility. Other objects of my invention will appear hereinafter.

In general, my new process comprises the steps of reacting dicyandiamide with a member of the group consisting of alkali metal and alkaline earth metal hydroxides in aqueous media. The conditions under which my reaction proceeds are subject to considerable variation. Since the alkali metal and alkaline earth metal salts of dicyandiamide are easily hydrolyzed and the reaction whereby they are formed follows generally in accordance with the law of mass action it is desirable that the reactants be present in as high a concentration as is practical. As a general rule it is best to add the less-soluble reactant, preferably in finely divided form, to a strong aqueous solution of the more soluble reactant. Since dicyandiamide is of comparatively low solubility at ordinary temperatures it is therefore usually most desirable to add it to a strong solution of the alkali metal or alkaline earth metal hydroxide. However, a solution of dicyandiamide at 80° C. can be made more concentrated than a solution of some alkaline earth hydroxide and when preparing dicyandiamide salts of the less soluble alkaline earth hydroxides better yields may be obtained by adding the alkaline earth hydroxide, or oxide, to a hot solution of dicyandiamide.

In the case of the more soluble alkali and alkaline earth hydroxides as KOH, NaOH and $Ba(OH)_2$, the hydroxide is of sufficient solubility to give excellent yields of the dicyandiamide salt without resorting to a special procedure such as dissolving one of the reactants in hot water or by using alcohols to depress the solubility of the reaction product. With these more soluble alkalies it is merely necessary to dissolve the alkali in water to form a strong alkali solution and add dicyandiamide thereto. The corresponding dicyandiamide salts will be formed in solution and if of sufficient concentration may be precipitated out as small sparkling colorless crystals. Cooling the reaction mixture is usually helpful in promoting deposition of the product.

In using elevated temperatures to secure more highly concentrated solutions of the reactants temperatures much in excess of 80° C. should be avoided. Even this high temperature should not be maintained for an appreciable length of time after the dicyandiamide has been added since dicyandiamide tends to slowly decompose at high temperatures with the formation of ammonia. The dicyandiamide salt formed during the reaction also tends to decompose with the formation of cyanurea and ammonia upon prolonged heating. Accordingly, while I may use elevated temperatures to secure initial high concentrations of the reactants I ordinarily use this procedure only when using the more difficultly soluble alkali or alkaline earth hydroxides.

When the dicyandiamide salt is to be employed as an intermediate in the preparation of other organic substances, for example, acylated dicyandiamides, it need not be recovered from solution and in such case the mixing of dicyandiamide with a strong aqueous solution of a desired alkali metal or alkaline earth metal hydroxide is sufficient for the formation of the desired dicyandiamide salt. To recover the product in crystalline form the reaction mixture may be cooled and the dicyandiamide salt contained therein crystallized out. Alternatively I may add an excess of an alkali or alkaline earth hydroxide and by the resulting mass action effect precipitate out of solution the dicyandiamide salt. These procedures are illustrated in the specific examples which follow. The precipitated salt may be removed from its mother liquor by filtration and may then be washed with a little cold water, acetone, ether or alcohol, preferably butanol, to remove free alkali. When recovered the washed product may then be vacuum dried. When recovered, purified and dried the product remains stable over a long period of time.

The dicyandiamide salts of the present invention are useful directly in the preparation of pyrotechnic compositions in which they decompose easily giving color to the flaming composition. They have greater utility, however, as intermediates in the preparation of various organic compounds such as acyl dicyandiamides. They are also valuable as intermediates in the preparation of dyes, resins, flameproofing compounds and other compositions. Some of the salts react with alcohols to yield dicyandiamide and the corresponding metallic alkoxide, the latter being useful in condensation reactions. Other uses of these dicyandiamide salts will suggest themselves to the skilled chemist.

My invention will now be illustrated in greater detail with reference to the following specific examples which disclose the preparation of dicyandiamide salts of the common water-soluble alkali and alkaline earth metals. Although these examples illustrate a number of variations by which my process may be modified, it is to be understood that they are given merely by way of illustration and are not intended to limit the invention thereto since obviously still further modifications may be made therein. My invention is therefore to be limited only by the scope of the appended claims.

*Example 1*

66 g. (1 mole) of 85% KOH was dissolved in 50 cc. of water and 84 g. (1 mole) of dicyandiamide added. The mixture cooled considerably but after warming to 40° C. an almost clear solution resulted. The slight amount of undissolved dicyandiamide was filtered and the solution poured into a mixture of crystallized KOH, prepared by dissolving 66 g. of 85% KOH in 25 cc. of water, and cooling. The mixture was shaken and cooled further in an ice bath. The crop of small sparkling colorless crystals which formed on cooling were filtered, washed with a little alcohol and dried in a vacuum desiccator. On analysis the product was found to contain 44.53% nitrogen which compared well with the calculated value of 45.86% for potassium dicyandiamide

($C_2H_3N_4K$)

The neutralization equivalent of 122.6 which was found compared with the calculated value of 122. On heating, a sample of the product decomposed without melting at 203–204° C.

*Example 2*

858 g. (13 moles) of 85% KOH was dissolved in 1200 cc. of boiling methanol, filtered and the filtrate placed in a 5-liter, 3-necked flask, stirred and cooled with an ice bath. To another solution of 660 g. (10 moles) of 85% KOH in 400 cc. of water was added 840 g. (10 moles) dicyandiamide. The resulting solution after warming to 40° C. was gradually added from a separatory funnel to the slurry of KOH in methanol. The resulting thick paste was stirred and cooled to 10° C. before filtration. After filtering as dry as possible, the damp cake was suspended in butanol, slurried, filtered and washed well with dry ether. The colorless solid, which was obtained in an 85% yield was placed in a vacuum desiccator for complete drying. On analysis the product was found to contain 43.68% nitrogen and to have a neutralization equivalent of 125. On heating a portion of the material decomposed at 205–206° C., the high decomposition temperature indicating a high degree of purity.

*Example 3*

A solution of 330 g. (5 moles) of 85% KOH in 250 cc. of water was prepared and 420 g. (5 moles) of dicyandiamide added. The pasty mass cooled considerably but after warming to 40° C. the colorless, thick syrup was filtered from a slight amount of unchanged dicyandiamide. This solution was gradually added from a separatory funnel to a well stirred, cooled mixture of 396 g. (6 moles) of crystallized 85% KOH in 600 cc. of methanol. This latter mixture was first obtained as a solution and filtered to remove insolubles. The potassium dicyandiamide was stirred, cooled to 10° C., filtered as dry as possible, suspended in butanol, filtered again, and washed with dry ether. Drying was completed in a vacuum desiccator. A 84% yield of potassium dicyandiamide was obtained which had a decomposition temperature of 203° C.

*Example 4*

600 g. of KOH (9 moles) was dissolved in 300 cc. of water and 252 g. (3 moles) of finely powdered dicyandiamide was added. The mixture was intimately ground with a stirring rod, cooled to 0° C. and the colorless solid filtered as dry as possible, washed with 200 cc. of 95% ethyl alcohol and dried in a vacuum desiccator. The product, potassium dicyandiamide was obtained in a quantitative yield.

*Example 5*

252 g. of powdered dicyandiamide was added to the combined filtrate and alcoholic washings from the above experiment (Example 4) which contained approximately 396 g. of KOH. The mixture was triturated, cooled to 0° C., filtered, and the colorless solid washed with 150 cc. of 95% alcohol. Drying was completed in a vacuum desiccator. Potassium dicyandiamide was obtained in an 89.5% yield.

*Example 6*

252 g. of powdered dicyandiamide was added to the combined filtrate and alcoholic washings from the above preparation (Example 5) which contained about 198 g. (3 moles) of KOH. Almost complete solution occurred and the solution became quite cool. The small amount of undissolved dicyandiamide was filtered off and the filtrate was mixed with benzene and concentrated under reduced pressure on a steam bath. More benzene was added after removal of the alcohol but water came off very slowly and ammonia was strongly evolved. On cooling solid separated which was filtered, washed with a little alcohol and dried in a vacuum desiccator. The product, which was obtained in a yield of 39%, was found to contain substantial amounts of potassium dicyandiamide.

*Example 7*

126 g. of 95% sodium hydroxide was dissolved in a mixture of 500 cc. of methyl alcohol and 100 cc. of water, the solution filtered, and 84 g. of dicyandiamide added. After triturating the mixture, it was cooled in an ice bath, the solid filtered, washed with acetone and dried in a vacuum disiccator. The product, sodium dicyandiamide, was obtained with a yield of 96.5%. On heating a portion of the material it decomposed at about 245° C. On analysis it was found to contain 51.80% nitrogen and had a neutralization equivalent of 115.2.

*Example 8*

127 g. of 95% sodium hydroxide was dissolved in 100 cc. of water and 84 g. of dicyandiamide was added thereto with stirring at 40° C. The mixture became so thick that 200 cc. of 95% ethyl alcohol was added. After cooling the pasty mass was filtered through a sintered glass funnel and washed with a little ethyl alcohol. The amorphous solid was then dried in a vacuum desiccator.

*Example 9*

51 g. of 95% sodium hydroxide was dissolved in 600 cc. of 85% ethyl alcohol and the solution filtered. 84 g. of dicyandiamide was then added in one quantity at 50° C. The mixture was triturated, cooled in an ice bath and filtered. After washing with ethyl alcohol, the solid was further dried in a vacuum desiccator. Sodium dicyandiamide was obtained in good purity by this procedure with an 82% yield.

*Example 10*

42 g. of lithium hydroxide monohydrate was dissolved in 200 cc. of boiling water and the solution allowed to cool slightly. 105 g. of dicyandiamide was then added and the mixture filtered. On cooling in an ice bath colorless crystals of lithium dicyandiamide were obtained. The crystals were filtered, washed with acetone and dried in a vacuum desiccator. A sample of the product on heating decomposed at about 164–165° C. On analysis it was found to contain 63.33% nitrogen and to have a neutralization equivalent of 87 which compared well with calculated values of 62.22% nitrogen and a neutralization equivalent of 90 for lithium dicyandiamide.

*Example 11*

115 g. of barium hydroxide octahydrate was dissolved in water and the solution filtered. 34 g. of dicyandiamide was added thereto with stirring at a temperature of 70° C. The hot solution containing the dissolved dicyandiamide was then filtered. On cooling the filtered solution in an ice bath deposits of colorless plate-like crystals were obtained. The crystals were then filtered, washed with a little ice water and dried in a vacuum desiccator. The product, barium dicyandiamide, was obtained with a yield of 97.5%.

*Example 12*

To a milky solution of 330 g. of barium hydroxide octahydrate in 500 cc. of water at 75° C. was added 210 g. of dicyandiamide. Complete solution of the dicyandiamide occurred and the turbidity was removed by filtration. After cooling crystals of barium dicyandiamide formed and were removed by filtration followed by washing with a little ice water and acetone. After drying the product in an Abderhalden drying piston with boiling acetone the product was analyzed and found to contain 36.55% nitrogen in comparison with the calculated value of 36.92% for barium dicyamdiamide. The product decomposed when heated to 140° C.

*Example 13*

132 g. of strontium hydroxide octahydrate was dissolved in 400 cc. of boiling water and after cooling slightly 105 g. of dicyandiamide was added with stirring. The hot solution was then filtered and the filtrate cooled in an ice bath. Colorless plate-like crystals of strontium dicyandiamide were recovered from the cold filtrate by filtration and were washed with acetone and dried in a vacuum desiccator.

What I claim is:

1. A method of preparing alkali metal and alkaline earth metal salts of dicyandiamide which comprises mixing dicyandiamide with a substantial excess of a compound of the group consisting of water-soluble alkali metal hydroxides and alkaline earth metal hydroxides over that required to react stoichiometrically with the dicyandiamide to form a salt thereof and an amount of water not substantially in excess of that necessary to dissolve the reactants.

2. A method of preparing alkali metal and alkaline earth metal salts of dicyandiamide which comprises mixing dicyandiamide with a substantial excess of a compound of the group consisting of water-soluble alkali metal hydroxides and alkaline earth metal hydroxides over that required to react stoichiometrically with the dicyandiamide to form a salt thereof and an amount of water not substantially in excess of that necessary to dissolve the reactants and precipitating out of solution the resulting dicyandiamide salt by mixing therewith additional amounts of a compound of the group consisting of water-soluble alkali metal hydroxides and alkaline earth metal hydroxides.

3. A method of preparing alkali metal and alkaline earth metal salts of dicyandiamide which comprises mixing in an amount of water not substantially in excess of that necessary to dissolve the reactants, dicyandiamide and a substantial excess of a compound of the group consisting of water-soluble alkali metal hydroxides and alkaline earth metal hydroxides over that required to react stoichiometrically with the dicyandiamide to form a salt thereof, allowing the mixture to react at temperatures not in excess of about 80° C. and thereafter separating the resulting dicyandiamide salt by cooling the reaction mixture.

4. A method of preparing alkali metal and alkaline earth metal salts of dicyandiamide which comprises adding to a saturated aqueous solution of dicyandiamide a compound of the group consisting of water-soluble alkali metal hydroxides and alkaline earth metal hydroxides in amounts in substantial excess of that required to react stoichiometrically with the dicyandiamide to form a salt thereof.

5. A method of preparing potassium dicyandiamide which comprises adding to a saturated aqueous solution of dicyandiamide a substantial excess of potassium hydroxide over that required to react stoichiometrically with the dicyandiamide to form potassium dicyandiamide.

6. A method of preparing alkali metal and alkaline earth metal salts of dicyandiamide which comprises adding dicyandiamide to a substantially saturated aqueous solution of a member of the group consisting of water-soluble alkali metal and alkaline earth metal hydroxides at a temperature of not more than about 80° C. and thereafter cooling the reaction mixture to separate the resulting dicyandiamide salt.

7. A method of preparing potassium dicyandiamide which comprises adding dicyandiamide to a substantially saturated aqueous solution of potassium hydroxide at a temperature of not more than about 80° C. and thereafter cooling the resulting solution to separate potassium dicyandiamide.

8. A method of preparing sodium dicyandiamide which comprises adding dicyandiamide to a substantially saturated aqueous solution of sodium hydroxide at a temperature of not more than about 80° C. and thereafter cooling the resulting solution to precipitate sodium dicyandiamide.

9. A method of preparing sodium dicyandiamide which comprises adding to a substantially saturated aqueous solution of dicyandiamide a substantial excess of sodium hydroxide over that required to react stoichiometrically with the dicyandiamide to form sodium dicyandiamide.

DONALD W. KAISER.